United States Patent
Petkov et al.

(10) Patent No.: US 7,136,293 B2
(45) Date of Patent: Nov. 14, 2006

(54) FULL WAVE SERIES RESONANT TYPE DC TO DC POWER CONVERTER WITH INTEGRATED MAGNETICS

(76) Inventors: Roumen D. Petkov, ZhenAn Hi-Tech Industrial Park, ZhenAn Road, ChangAn Town, DongGuang City, GuangDong Province (CN); Gueorgui J. Anguelov, ZhenAn Hi-Tech Industrial Park, Zhen-An Road, ChangAn Town, DongGuang City, GuangDong Province (CN)

( * ) Notice: Subject to any disclaimer, the term of this patent is extended or adjusted under 35 U.S.C. 154(b) by 306 days.

(21) Appl. No.: 10/877,058

(22) Filed: Jun. 24, 2004

(65) Prior Publication Data
US 2005/0286270 A1  Dec. 29, 2005

(51) Int. Cl.
*H02M 7/06* (2006.01)
(52) U.S. Cl. ............... 363/126; 363/17; 363/127; 336/170; 336/178; 336/182; 336/215
(58) Field of Classification Search .............. 363/17, 363/126, 127; 336/170, 178, 182, 215
See application file for complete search history.

(56) References Cited

U.S. PATENT DOCUMENTS

| | | | | |
|---|---|---|---|---|
| 3,753,076 A | * | 8/1973 | Zelina | 363/133 |
| 4,262,328 A | | 4/1981 | Bloom et al. | 363/16 |
| 4,612,527 A | * | 9/1986 | Third et al. | 336/5 |
| 4,675,796 A | * | 6/1987 | Gautherin et al. | 363/20 |
| 4,766,365 A | * | 8/1988 | Bolduc et al. | 323/308 |
| 4,774,649 A | * | 9/1988 | Archer | 363/20 |
| 4,825,348 A | | 4/1989 | Steigerwald et al. | 363/17 |
| 4,853,668 A | | 8/1989 | Bloom | 336/214 |
| 4,858,093 A | | 8/1989 | Sturgeon | 363/20 |
| 4,858,095 A | * | 8/1989 | Narita et al. | 363/21.04 |
| 4,959,764 A | * | 9/1990 | Bassett | 363/16 |
| 5,073,849 A | * | 12/1991 | Morris | 363/21.03 |
| 5,353,212 A | | 10/1994 | Loftus, Jr. | 363/17 |
| 5,426,409 A | * | 6/1995 | Johnson | 336/178 |
| 5,555,494 A | | 9/1996 | Morris | 363/17 |
| 5,619,400 A | | 4/1997 | Bowman et al. | 363/15 |
| 5,907,236 A | | 5/1999 | James | 323/255 |
| 5,907,479 A | * | 5/1999 | Leu | 363/16 |
| 6,456,509 B1 | * | 9/2002 | Yasumura | 363/21.02 |
| 6,577,510 B1 | * | 6/2003 | Yasumura | 363/21.02 |
| 6,952,353 B1 | * | 10/2005 | Yan et al. | 363/16 |

* cited by examiner

*Primary Examiner*—Jeffrey Sterrett

(57) ABSTRACT

A full wave DC/DC converter magnetically integrates into the transformer assembly the functions of the resonant inductor, magnetizing inductor and the output filter inductor. The primary and the secondary windings are assembled on a gapped center leg of an E-core, while two output filter windings with an equal number of turns are assembled on gapped left and gapped opposed side legs of the E-core. The length of the gaps in the side legs is selected so that the DC current does not saturate the side legs. The two filter windings are connected in series and are oppositely polarized so that the voltages induced in these windings by the primary winding flux cancel each other.

12 Claims, 10 Drawing Sheets

FULL WAVE SERIES RESONANT TYPE DC TO DC POWER CONVERTER WITH INTEGRATED MAGNETICS

FIELD OF THE INVENTION

The invention relates to series resonant type power converters which employ transformers with integrated resonant, magnetizing and output filter inductors.

BACKGROUND ART

It is required from the contemporary DC to DC switch mode power converters to have high power density, high efficiency and low cost. Certain series resonant type DC to DC power converters, such as the conventional series resonant converter, the LLC converter or the resonance tapped transformer converter described in U.S. Pat. No. 5,907,236 attempt to meet these requirements by providing zero voltage switching operation of power transistors on the primary side of the converter and zero current switching operation of output rectifiers on the secondary side.

Zero voltage and zero current switching are well established switching techniques for reducing switching losses. This allows higher switching frequencies, reduced size of magnetic components, increased power density and reduced cost. Another means of reducing the size of magnetic components is to integrate into the transformer the inductors needed for the normal operation of the converter, such as the resonant, magnetizing and the output filter inductors. The transformer is usually the bulkiest and most expensive component of the circuit.

It is known to employ the leakage inductance between the primary and secondary winding of a transformer as a resonant tank inductance, or in other words to integrate the resonant inductor into transformer's structure. The value of the leakage inductance can be controlled by spacing apart the primary and secondary windings in radial or axial directions as well as by using so called "magnetic shunts".

It is also known to employ the magnetizing inductance of a transformer for storing energy and extending the load current range featuring zero voltage switching conditions. The value of the magnetizing inductance can be controlled by gapping the transformer and changing the gap dimensions. Such design approach also results in integration of the required magnetizing inductance into transformer's magnetic structure.

A discussion of such "integrated magnetics" design techniques can be found in a text by R. Severns and G. Bloom entitled "Modem DC/DC Switchmode Power Converter Circuits"; (Van Nostrand Reinhold Company, 1985).

Integrated magnetic structures are also described in U.S. Pat. No. 4,262,328 to Bloom, U.S. Pat. No. 5,619,400 to Bowman and U.S. Pat. No. 5,555,494 to Morris.

FIG. 2 illustrates a prior art integrated magnetics converter disclosed in U.S. Pat. No. 5,555,494. The primary winding of the transformer located on the middle, ungapped leg of an E-shape transformer core is powered by a full wave, pulse width modulation (PWM) controlled converter. The primary winding induces flux in the transformer core, so that two secondary windings provide current to the load. Each of the secondary windings is located on a gapped side leg of the E-shape magnetic structure and performs smoothing (filter) inductor function in addition to its conventional, secondary voltage source function. Such integration of the filter inductor in the secondary winding provides inductively filtered output and is therefore not suitable for series resonant type DC to DC power converters that require capacitively filtered output. The presence of a filter inductor in the output rectifier path seriously disturbs the operation of series resonant type converters and eliminates some of their advantageous characteristics, such as reduced voltage stress and reduced switching losses in output rectifiers. An output filter inductor in series resonant type converters can only be employed if the converter output has already been capacitively filtered, i.e. such inductor can only be connected between an output filter capacitor and the load impedance.

A further disadvantage of Morris's converter is the need to double the number of turns of the secondary winding when moving it from the center leg of the transformer to the side legs. This leads to increased copper losses in the secondary winding not only because of the increased wire length but because of increased eddy currents losses as well, especially if the number of turns needed cannot be wound in a single layer. Another disadvantage of Morris's converter is the significantly reduced magnetic coupling and increased leakage inductance between the spaced apart halves of the center tap secondary which results in voltage spikes (due to magnetic field energy stored in this leakage inductance) when output rectifiers commutate the load current. Heavy snubbing is usually needed to eliminate these spikes resulting in increased power dissipation and reduced power conversion efficiency.

SUMMARY OF THE INVENTION

In conventional E-shape transformers, the magnetic material of the side legs is not utilized. However, an output filter inductor can be formed and magnetically integrated into an E-shape transformer structure if its side legs are gapped with an equal gap length and two additional windings with an equal number of turns are wound on these legs. These windings should be connected in series and reverse polarized, so that the high frequency voltages induced in the windings by the primary winding flux cancel each other. Such winding assembly should then be connected in series with the load impedance (as an equivalent output filter inductor) so that the dc-current of the load will flow through these windings. The number of turns of these additional windings and the gap length of the side legs should be selected so that the maximum value of the load current will not cause saturation of side leg magnetic material. If this condition is satisfied the side leg magnetic volume can be employed as a higher permeability magnetic core of a filter inductor whose inductance can be controlled by the number of turns of the side leg windings and the gap length of side legs.

A distinctive advantage of such integrated output inductor is that its inclusion in the magnetic structure of the transformer will not disturb the normal operation of series resonant type power converters and will preserve their advantageous features. This follows from the magnetic symmetry that exists between the primary winding and the side legs windings and between the secondary winding and the side legs windings because the side leg windings are geometrically symmetrical regarding both the primary and the secondary windings. In addition the side leg windings have an equal number of turns and are connected in series in a reverse polarized manner. Under these conditions, any voltage disturbance induced in one of the side leg windings by the primary winding flux will be accompanied by a generation of an equal voltage (because of magnetic symmetry) in the other side leg winding but with an opposite polarity (because the side leg windings are reverse polarized in their series assembly). As a result such series assembly of side leg windings will generate zero net disturbance on its terminals. Similarly, any transient (with an ac-nature) disturbances in the current flowing through side leg windings will generate ac-fluxes in the side legs with equal amplitudes but opposite directions, so these fluxes will cancel each other in the center leg where the primary and secondary windings are wound. In this way the primary and secondary windings will not be affected by transient fluxes generated by the current in the side leg windings. Such behavior is equivalent of the primary winding being magnetically decoupled from the series combination of reverse polarized side leg windings forming an equivalent filter inductor. Due to the same reasons the equivalent filter inductor behaves as though it was magnetically decoupled from the secondary winding as well. This in turn means that the equivalent filter inductor behaves like an external inductive component, magnetically separated from the primary and secondary windings and therefore it will not disturb the normal operation of a series resonant type converter.

Another distinctive advantage of such integrated output inductor, in comparison with the prior art integrated output inductor, is that its windings carry a direct, very low ripple current and can be wound with inexpensive, solid and thick copper wire without eddy current loss penalties.

The present invention optimizes the magnetic elements of a series resonant type DC to DC converter by a novel design which is magnetically integrated so that the function of the output filter inductor is magnetically included in the transformer assembly. A series resonant type switcher produces an ac-voltage across the primary winding of an E-shape transformer in a full wave manner. The primary winding is wound on the center leg of the E-shape transformer. The center leg is preferably gapped, so that the resultant magnetizing inductance is lowered and stores magnetizing energy needed for facilitating the zero voltage switching operation of the switching devices in the switcher. A full wave rectifier (center tap or full bridge) is connected to the secondary winding of the transformer and the rectified voltage is then filtered by a filter capacitor. The secondary winding is wound on the center leg of the transformer and is geometrically spaced apart from the primary winding, either in radial or axial direction, so that the leakage inductance between these windings is utilized in the series resonant tank of the power converter.

Two, equal turns windings are wound on equally gapped side legs of the E-shape core and are connected in series with reversed polarity, so that the voltages induced in these windings by the primary winding flux cancel each other. This series combination of side leg windings is then connected between the filter capacitor and an output terminal of the power converter in series with the dc-load impedance so the side leg windings carry dc-load current and generate corresponding dc-flux in the magnetic structure of the E-core. The number of turns of the side legs windings and the side-legs gaps are selected so that the total magnetic flux resulting from the dc-flux generated by the load current and the ac-flux generated by the primary winding does not saturate the magnetic material of the side legs. If this condition is satisfied the dc-flux stores flux energy in the side leg magnetic structure which is released to the load when this flux collapses, so that such series combination of side leg windings performs as an equivalent filter inductor. The inductance of that equivalent inductor is a function of the magnetic properties of the side leg magnetic material (permeability, length and cross-sectional area) and can be controlled by adjusting the number of turns of side leg windings and the gap length of side legs.

The ac-component of the side leg winding current is typically very small since it originates from a rectified and capacitively well-filtered voltage. This allows the side leg windings to be wound with an inexpensive, solid and thick copper wire or copper strip since the eddy current copper loss generated by the ac-component of the winding current is very small.

Elimination of a separate filter inductor leads to improved power converter density and reduced manufacturing cost.

DETAILED DESCRIPTION OF THE PREFERRED EMBODIMENT

Figure 1:
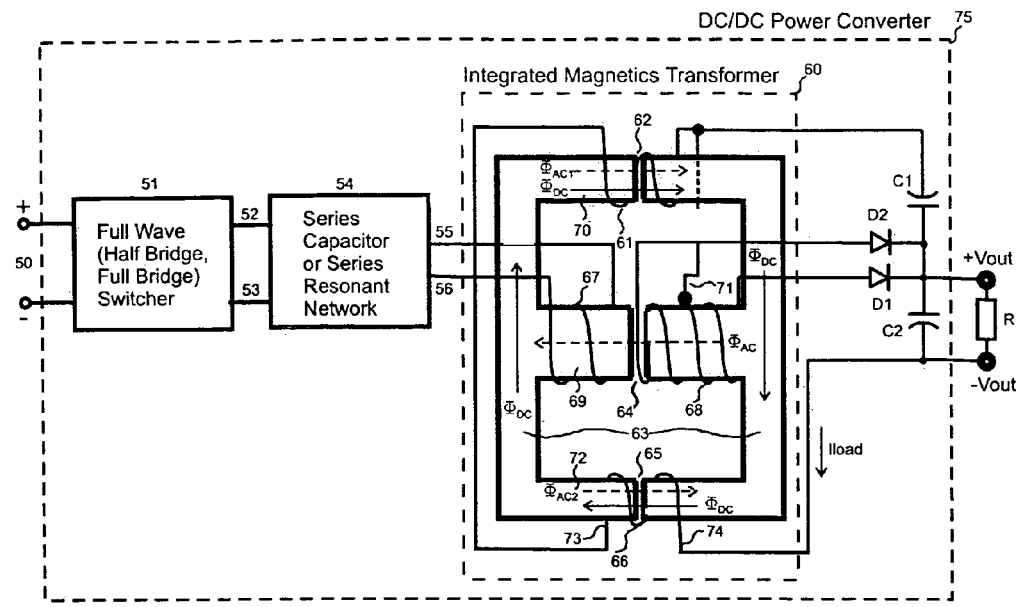
FIG. 1 illustrates an embodiment of the present invention with a center tap secondary winding.
Figure 2:
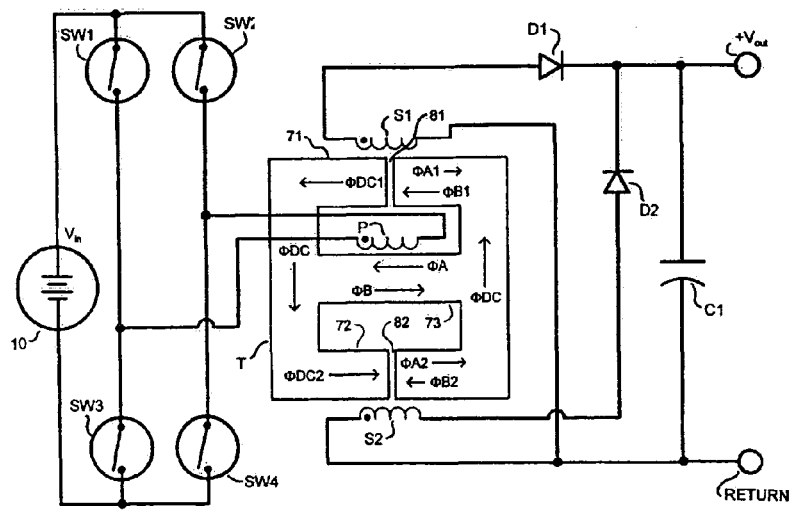
FIG. 2 illustrates a prior art converter having integrated magnetic function.

A schematic of the preferred embodiment of a DC to DC converter embodying the principles of the invention is shown in FIG. 1. A full wave switcher 51, containing controlled switching elements arranged in either half bridge or full bridge configuration is connected to a low impedance dc-source 50. The switching elements in the switcher are consequently turned on and off with 50% duty cycle and their switching frequency is controlled, so that switcher 51 produces square-wave voltage with 50% duty cycle and controlled frequency on its terminals 52 and 53. This square-wave voltage is then applied in series with a capacitor or series resonant network 54 and the resulting voltage between terminals 55 and 56 is then applied to primary winding 67 of an integrated magnetics transformer 60 arranged on an E-shape magnetic core 63. The number of turns of primary 67 is selected so that the ac (alternating current) magnetic flux $\Phi_{AC}$ generated by the primary winding 67 provides an optimum both thermal and power efficiency performance of integrated magnetics transformer 60. E-shape core 63 is gapped with gap 64 on its center leg 69 and gaps 62 and 65 on its side legs 70 and 72 respectively. Side legs gaps 62 and 65 have an equal gap length.

The gap length of gap 64 is selected to provide a certain value of magnetizing inductance of primary winding 67 that facilitates the zero-voltage switching conditions of the switching devices in switcher 51.

Gaps 62, 64 and 65 might contain either non-magnetic material or low permeability magnetic material or combination of both. A center tap secondary winding 68 with a center tap terminal 71 is wound on center leg 69.

The primary to secondary turns ratio is selected in accordance with the available input source 50 voltage and desired output voltage between terminals +Vout and −Vout of DC to DC power converter 75. Secondary winding 68 may be spaced apart in axial or radial direction from the primary winding 67 targeting an increase of the leakage inductance between these windings in order to reduce or eliminate the resonant inductor that might be present in series resonant network 54.

Both ends of secondary winding 68 are connected to the anodes of rectifiers D1 and D2 in a center tap rectifier configuration. The cathodes of rectifiers D1 and D2 are connected to a filtering capacitor C1 in node +Vout which is the positive output terminal of DC/DC power converter 75. The other end of capacitor C1 is connected to center tap terminal 71 of secondary winding 68.

First 61 and second 66 side leg windings, having an equal number of turns, are wound respectively on side legs 70 and 72 of magnetic core 63. The geometrical positions of windings 61 and 66 on side legs 70 and 72 are symmetrical with respect to the position of primary winding 67 on center leg 69 so that the magnetic coupling between primary 67 and first side leg winding 61 is equal to the magnetic coupling between primary 67 and second side leg windings 66.

One of the ends of winding 61 is connected to center tap terminal 71 of secondary winding 68, while the other end of winding 61 is connected to end 73 of winding 66, so that windings 61 and 66 are connected in series. Windings 61 and 66 are reverse polarized regarding the magnetic ac-flux $\Phi_{AC}$ generated by primary winding 67, so that the voltages induced in these windings by flux components $\Phi_{AC1}$ and $\Phi_{AC2}$ of the primary flux $\Phi_{AC}$ cancel each other. Such voltage cancellation is equivalent to the primary winding 67 being magnetically decoupled from the series assembly of windings 61 and 66.

End 74 of winding 66 is connected to terminal −Vout which is the negative output terminal of DC to DC power converter 75. A second filter capacitor C2 might be connected between terminals +Vout and −Vout. A load impedance R is connected between output terminals +Vout and −Vout and causes dc-current Iload to flow through R. Current Iload also flows through side led windings 61 and 66 and creates corresponding magnetic dc-flux $\Phi_{DC}$ in the magnetic structure of core 63. The number of turns of side leg windings 61 and 66 and the length of gaps 62 and 65 are selected so that the resultant magnetic flux $\Phi_{DC}+\Phi_{AC1}$ in side leg 70 and resultant magnetic flux $\Phi_{DC}-\Phi_{AC2}$ in side leg 72 do not saturate the magnetic material of core 63 at the maximum load current value. Dc-flux $\Phi_{DC}$ stores flux energy in the magnetic structure of side legs 70 and 72 which is released to the load when $\Phi_{DC}$ collapses, so that the series assembly of windings 61 and 66 acts as an equivalent filter inductor. The inductance of that inductor depends on the effective magnetic permeability, magnetic length and cross-sectional area of side legs 70 and 72, as well as on the number of turns of side legs windings 61 and 66.

Figure 3:
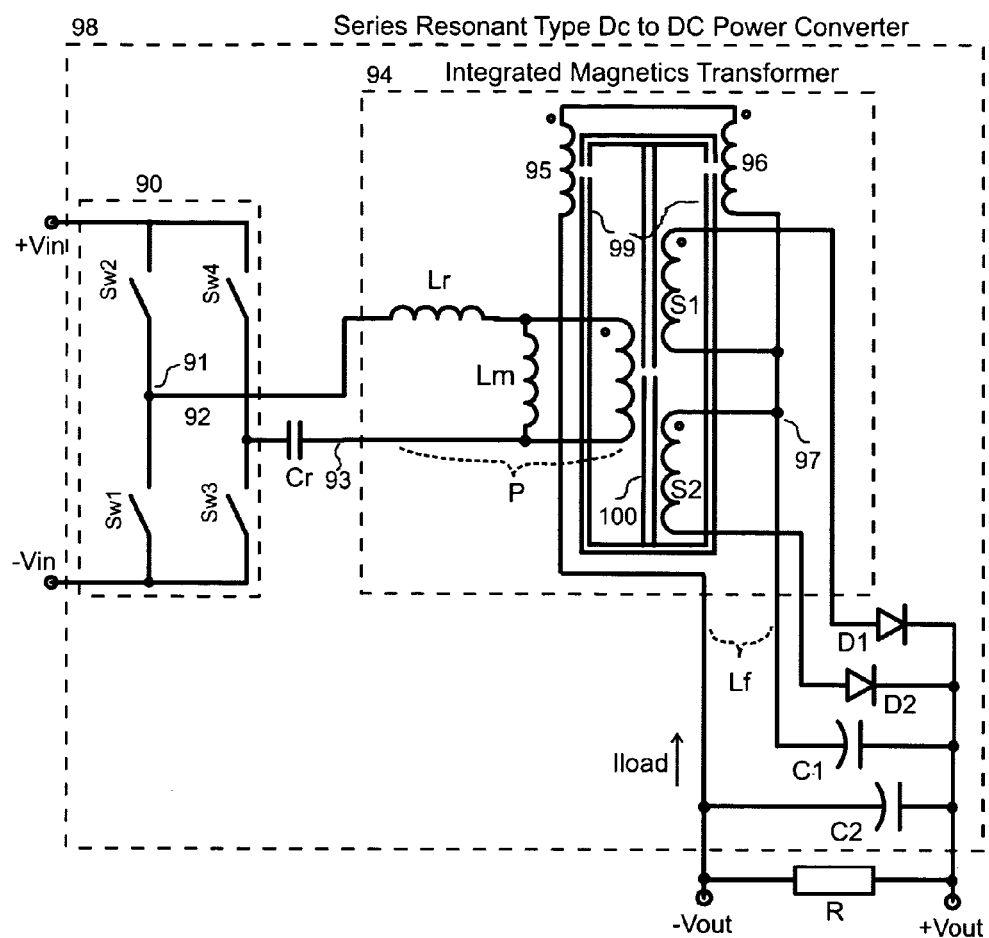
FIG. 3 illustrates an electrical circuit of a series resonant type power converter with integrated magnetics as per the preferred embodiment of the present invention.

FIG. 3 is an equivalent circuit diagram of the embodiment of FIG. 1. The full wave switcher 51 from FIG. 1 is represented in FIG. 3 by switches Sw1, Sw2, Sw3 and Sw4 connected in a full bridge configuration 90. The operating frequency of these switches is controlled and they turn on and off with 50% duty cycle so that a square-wave voltage with controlled frequency and 50% duty cycle is produced across output terminals 91, 92 of the bridge. This voltage is then applied to a series resonant capacitor Cr represented in FIG. 1 by block 54 and the resultant square-wave voltage across terminals 91 and 93 is then applied to the primary winding P of integrated magnetics transformer 94. The leakage inductance between primary P and center tap secondaries S1 and S2 forms a resonant inductor Lr, while gapped center leg 100 (69 in FIG. 1) provides magnetizing inductance Lm. In this way inductors Lr and Lm which are needed for the series resonant operation of power converter 98 are integrated into the magnetic structure of transformer 94. An additional discrete inductor can be inserted in series with Lr if the leakage inductance between primary and secondaries is insufficient for the proper resonant operation of power converter 98.

Center tapped secondaries S1 and S2 are connected to the anodes of output rectifiers D1 and D2 in a typical, center tap rectifier configuration. The common cathode of D1 and D2 forms positive output terminal +Vout of power converter 98. The output voltage of center tapped rectifier between center tap terminal 97 and +Vout is filtered by a capacitor C1.

Windings 95 and 96 are connected in series and reverse polarized (note the dots) regarding the magnetic flux of primary winding 67 and then connected between center tap terminal 97 and negative output terminal −Vout of power converter 98. Winding 95 and 96 in FIG. 3 are represented in FIG. 1 as windings 61 and 66. The series assembly of reverse polarized windings 95 and 96 forms an equivalent inductor Lf. A second filter capacitor C2 and a load resistor R are connected between output terminals +Vout and −Vout.

It is clear from the electrical circuit in FIG. 3 that the magnetic flux of primary P will induce zero voltage in the series assembly of reverse polarized windings 95 and 96 (inductor Lf). It is also clear that dc-load current Iload flowing through windings 95 and 96 will create dc-flux in the magnetic material of the side legs 99. However, due to magnetic polarization of 95 and 96 this dc-flux will not penetrate center leg 100 where the energy transfer between primary P and secondaries S1 and S2 takes place. Finally it is clear that if both side legs 99 are appropriately gapped this dc-flux will not saturate their magnetic material and the effective permeability of side legs 99 will contribute to the inductance of Lf.

Figure 4:
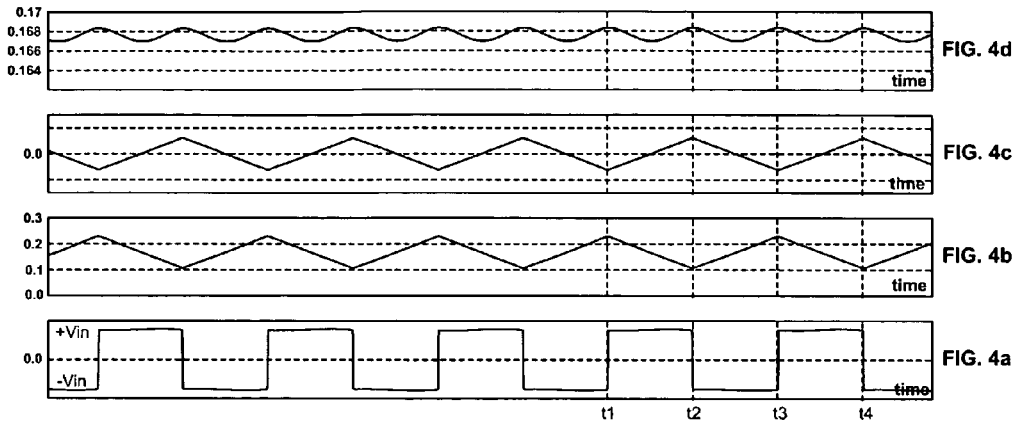
FIGS. 4a–4d illustrates primary voltage and magnetic flux density waveforms in an E-shape integrated magnetics transformer of a series resonant type power converter.

FIG. 4 illustrates timing waveforms of magnetic flux densities in the integrated magnetics transformer according to the invention, whose primary is powered by the square-wave voltage signal in FIG. 4a. Referring to both FIG. 1 and FIG. 4, the square-wave voltage in FIG. 4a is applied across terminals 55 and 56 in FIG. 1. FIG. 4c illustrates the flux density in center leg 69 (FIG. 1) of integrated magnetics transformer 60 (FIG. 1). As expected, the flux density has a triangular shape and is symmetrical regarding the X-axis, i.e., the center leg flux is not dc-biased. FIG. 4b illustrates flux density in the side legs 70 and 72 (FIG. 1) of the core and as expected the flux density there is dc-biased due to dc-load current Iload (FIG. 1) flowing through windings 61 and 66 (FIG. 1). A waveform of the dc-flux density created by the dc-load current in the side legs is shown in FIG. 4d and certain observations are apparent from FIG. 4d. Firstly, the ac-ripple of the dc-flux density is very small (0.6% in this particular case). Secondly, the frequency of this ac-ripple is twice as high as the frequency of the excitation voltage in FIG. 4a. Thirdly, the average flux density is about 0.168 Tesla, which in this particular case is about a half of the saturation flux density of the magnetic material used.

Figure 5:
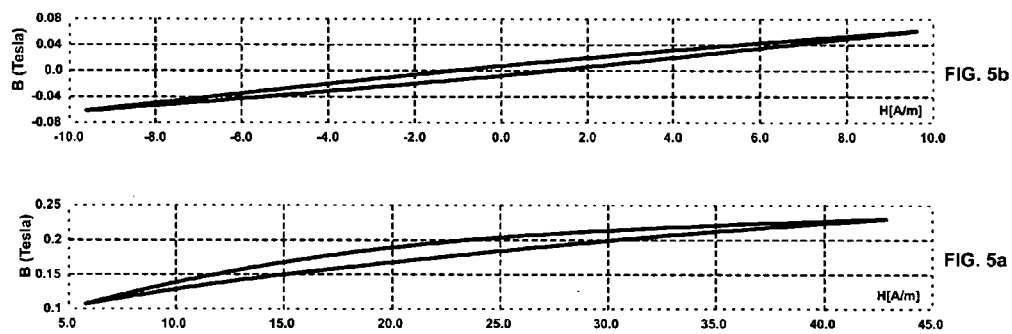
FIGS. 5a–5b illustrates magnetization curves (magnetic flux density versus magnetic field intensity waveforms) in the center and side legs of an E-shape integrated magnetics transformer.

Further illustration of magnetization processes in magnetic material of core 63 (FIG. 1) is provided by FIG. 5a illustrating the magnetization cycle B(H) in side legs 70 and 72 (FIG. 1). The slight distortion in the top (charging) part the magnetization cycle is due to proximity of the knee of the magnetic material magnetization curve. Such distortion is absent in FIG. 5b showing the magnetization cycle in center leg 69 (FIG. 1) of the integrated magnetic core. The magnetization curve here is symmetrical regarding both B and H axes. It can also be noticed that the magnetization curve in FIG. 5a is slightly wider than the one in FIG. 5b, indicating that hysteretic loss in the magnetic material of the side legs is slightly higher than in the center leg.

Figure 6:
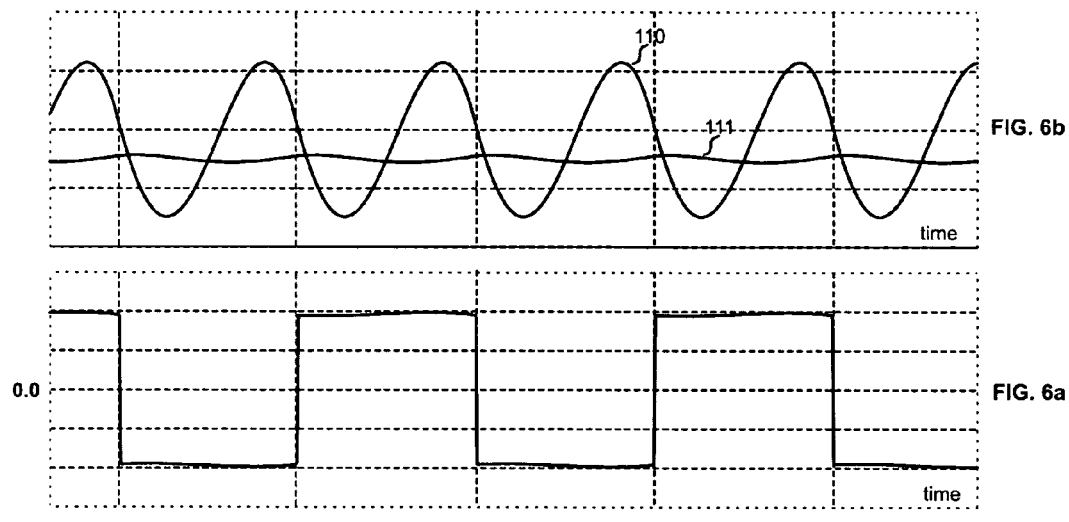
FIGS. 6a–6b illustrates primary voltage and ac-ripple of the rectified output voltage before and after the integrated filter inductor.

FIG. 6 illustrates the filtering affect of integrated filter inductor Lf (FIG. 3), where FIG. 6a is the timing waveform of the primary voltage of integrated magnetics transformer applied between terminals 91 and 93 (FIG. 3), while waveform 110 in FIG. 6b illustrates the ac-ripple of the voltage across filtering capacitor C1 (FIG. 3). Waveform 111 shows the ac-ripple of the voltage across capacitor C2 (FIG. 3), after being filtered by integrated filter inductor Lf (FIG. 3). The filtering effect of Lf is clearly visible.

Figure 7:
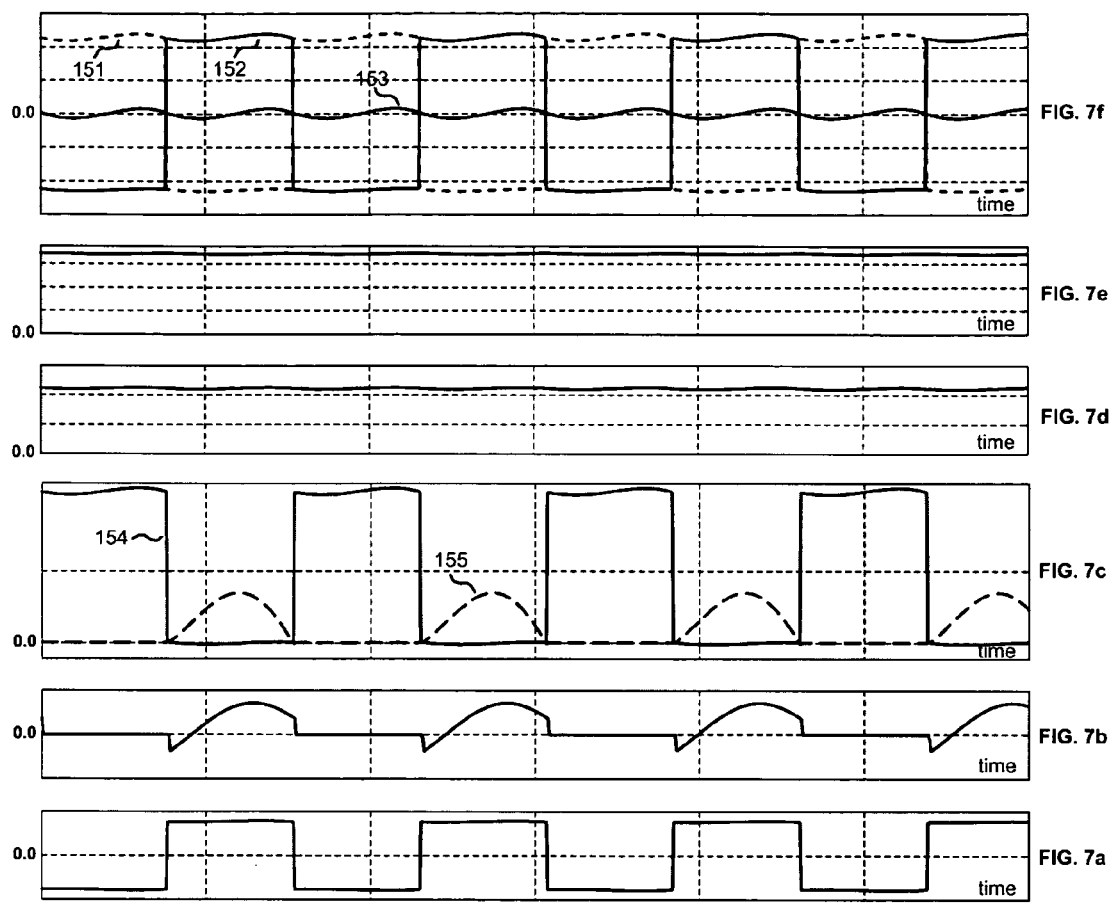
FIGS. 7a–7f illustrates voltage and current waveforms of a series resonant type power converter with integrated magnetics transformer.

The normal operation of series resonant type power converter 98 (FIG. 3) employing the integrated magnetics transformer 94 (FIG. 3) is illustrated in FIG. 7, where FIG. 7a shows timing waveform of the voltage across terminals 91 and 93 (FIG. 3) that is the excitation voltage of integrated magnetics transformer 94 (FIG. 3). A waveform of the current through the switching devices of full bridge switcher 90 (FIG. 3) is shown in FIG. 7b. It is a typical current waveform of the switching device in a series resonant type power converter with a clearly visible negative portion used to provide zero voltage switching. The waveform 154 in FIG. 7c illustrates the voltage across output rectifier D1 (FIG. 3), while waveform 155 illustrates the current through rectifier D1 (FIG. 3). These are also typical waveforms of a series resonant type power converter indicating the zero current switching conditions of its output rectifier. The voltage across first filter capacitor C1 (FIG. 3) is shown in FIG. 7d and it is clearly visible that its ac-ripple is very low. This is also typical for series resonant type converter whose square-wave output voltage is easy to filter after rectification. The current through windings 95 and 96 (FIG. 3) constituting the equivalent filter inductor Lf (FIG. 3) is shown in FIG. 7e. Its ac-ripple is hardly visible which confirms the abovementioned possibility of having these windings wound with thick, solid copper magnet wire without eddy current loss penalties. FIG. 7f illustrates timing waveforms of voltages across side leg windings 95 and 96 (FIG. 3) and their series assembly denoted as Lf (FIG. 3). Waveform 151 in FIG. 7f is the voltage across winding 95 (FIG. 3), waveform 152 is the voltage across winding 96 (FIG. 3), while waveform 153 is the net voltage across both winding measured between nodes −Vout (FIG. 3) and 97 (FIG. 3). It is clear from FIG. 7f that due to the polarization of windings 95 and 96 (FIG. 3) the voltages induced in these windings by the primary winding flux cancel each other and the net voltage across the series assembly of these windings does not have square-wave component. This confirms the magnetic decoupling phenomenon that is existent between primary winding P (FIG. 3) and the series assembly of reverse polarized windings 95 and 96 (FIG. 3) represented as an equivalent filter inductor Lf (FIG. 3).

The waveforms in FIG. 7a through FIG. 7d confirm that the use of the integrated magnetics transformer according to the invention does not have an adverse effect on the performance of a typical series resonant type power converter. Furthermore, the waveforms in FIG. 7e and FIG. 7f indicate that integrated magnetics transformer enhances further the advantageous characteristic of the series resonant type power converter by integrating an output filter inductor in its transformer structure.

It should be clarified that all the waveforms from FIG. 4 to FIG. 7 and the numeric values in these figures are only intended to illustrate the operating principle of the present invention in a single practical case and do not whatsoever limit the scope of the invention to those exactly waveforms or to those numeric values.

Figure 8:
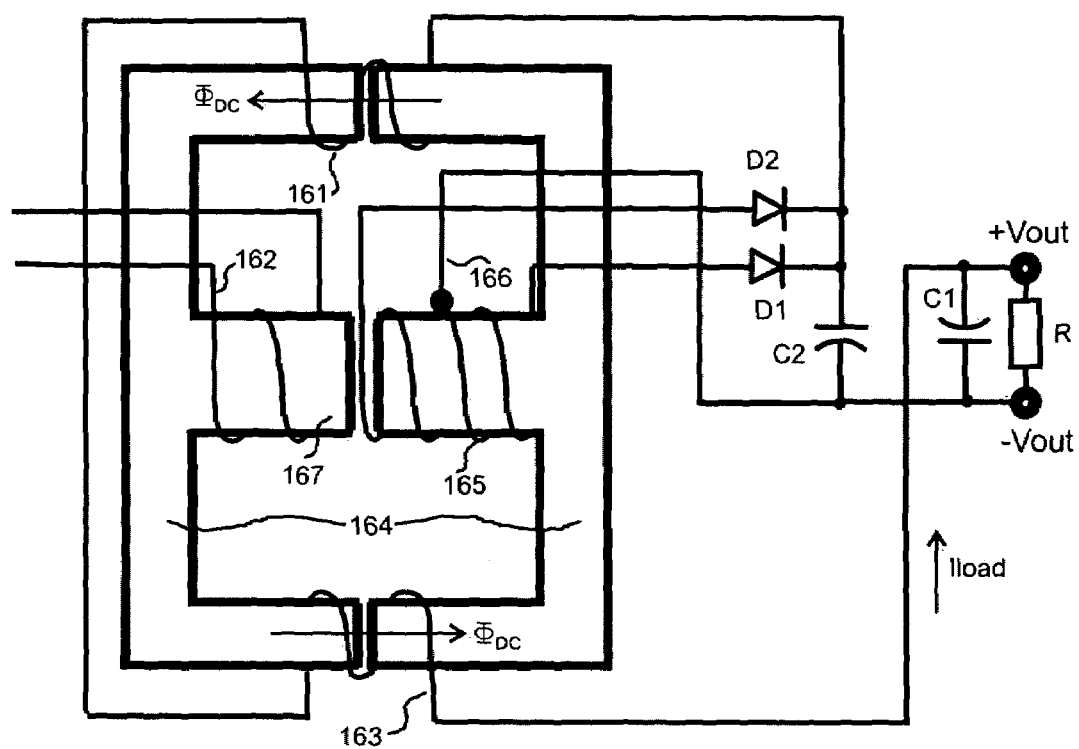
FIG. 8 illustrates an embodiment of the present invention with a center tapped secondary winding and integrated filter inductor connected to the positive output terminal.
Figure 9:
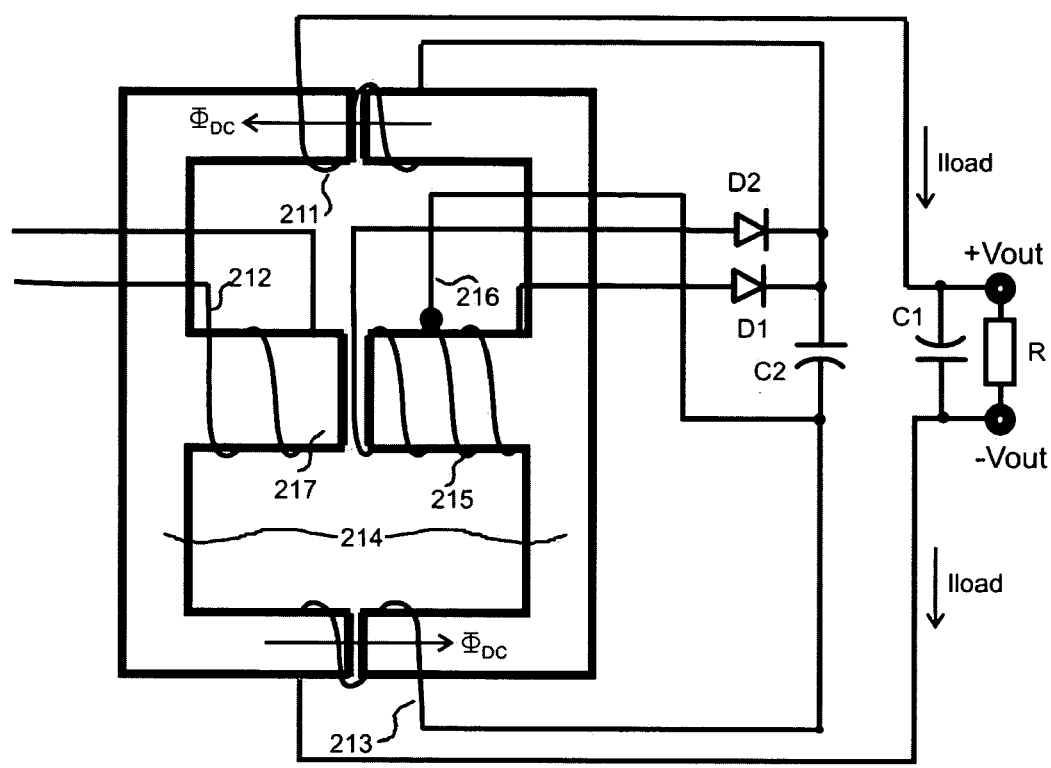
FIG. 9 illustrates an embodiment of the present invention with a center tapped secondary winding and integrated filter inductor connected to both negative and positive output terminals.

While in the preferred embodiment of the invention in FIG. 1 the equivalent filter inductor comprising the series combination of reverse polarized windings 95 and 96 (FIG. 1) is connected to the negative output terminal −Vout, it is equally possible to connect that inductor to the positive output terminal +Vout, as illustrated in FIG. 8, or to divide the equivalent filter inductor into two parts and connect those to both positive +Vout and negative −Vout output terminals, as illustrated in FIG. 9. It is also possible, and in the spirit of the present invention, to employ the equivalent filter inductor in conjunction with a full bridge (not center tapped) output rectifier configuration as illustrated in FIG. 10, FIG. 11 and FIG. 12.

The magnetic core 164 and windings 161, 162, 163 and 165 of the integrated magnetics transformer in FIG. 8 are magnetically configured in the same manner as in the preferred embodiment in FIG. 1, meaning that the dc magnetic flux $\Phi_{DC}$ created in the side legs by the load current Iload does not saturate the side legs and does not flow through the center leg 167. The primary winding 162 in FIG. 8 is powered from the same series capacitor or series resonant network as 54 in FIG. 1. The side leg windings 161 and 163 in FIG. 8 are interconnected and magnetically polarized in the same way as windings 61 and 66 in FIG. 1. The center tapped secondary winding 165 in FIG. 8 is also wound on the center leg and its ends are connected to the anodes of rectifiers D1 and D2 as in FIG. 1 however in FIG. 8 the center tap terminal 166 of the secondary winding 165 is connected directly to the negative output terminal −Vout. Filter capacitor C1 in FIG. 8 is connected across the output terminals +Vout and −Vout and the equivalent filter inductor comprising the series combination of reverse polarized windings 161 and 163 in FIG. 8 is inserted between the positive output terminal +Vout and the common cathode of rectifiers D1 and D2.

FIG. 9 illustrates an embodiment of the present invention in which the core 214 and windings 211, 212, 213 and 215 of the integrated magnetic transformer are magnetically configured in the same manner as in the preferred embodiment in FIG. 1, meaning that the dc magnetic flux $\Phi_{DC}$ created in the side legs by the load current Iload does not saturate the side legs and does not flow through the center leg 217. The primary winding 212 in FIG. 9 is powered from the same series capacitor or series resonant network as 54 in FIG. 1. Contrary to FIG. 1 however, the electrical connection between the side leg windings 211 and 213 is broken in FIG. 9 and filter capacitor C1 (FIG. 9) is connected across the output terminals +Vout and −Vout. Also in FIG. 9, the center tap terminal 216 of the secondary winding 215 is connected to side leg winding 213 and one of the ends of filter capacitor C2 while the other end filter capacitor C2 is connected to the common cathode of rectifiers D1 and D2. The anodes of rectifiers D1 and D2 are connected to the ends of secondary winding 215 in a typical center tap rectifier configuration. Side leg winding 211 is connected between the common cathode of rectifiers D1 and D2 and the positive output terminal +Vout, while side leg winding 213 is connected between the center tap terminal 216 of the secondary winding 215 and the negative output terminal −Vout. In this way side leg windings 211 and 213, forming the equivalent filter inductor, are electrically connected to both output terminals which is sometimes desirable from electromagnetic interference (EMI) perspective.

Figure 10:
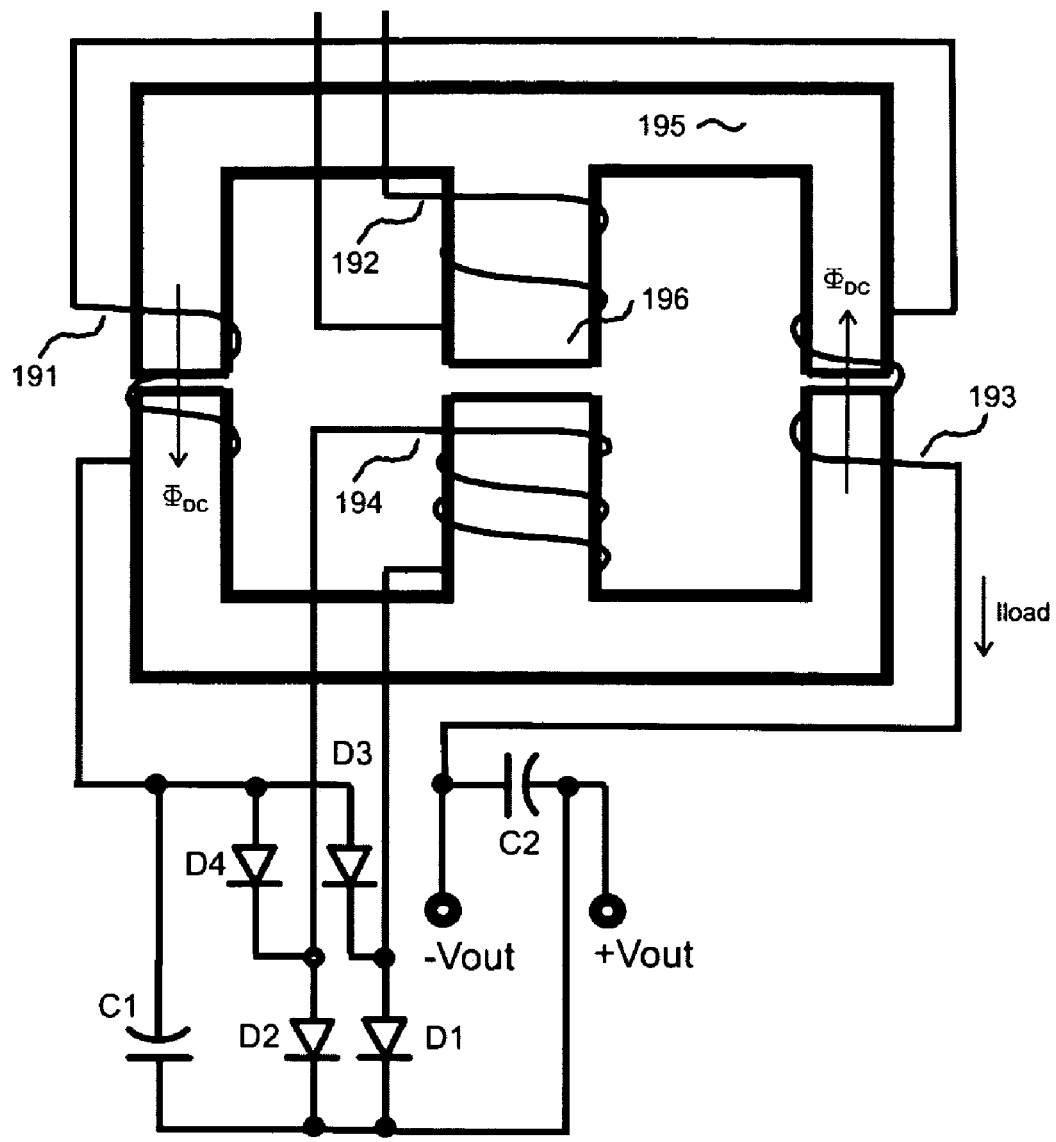
FIG. 10 illustrates an embodiment of the present invention with a single secondary winding connected to a full bridge rectifier and integrated filter inductor connected to the negative output terminal.
Figure 11:
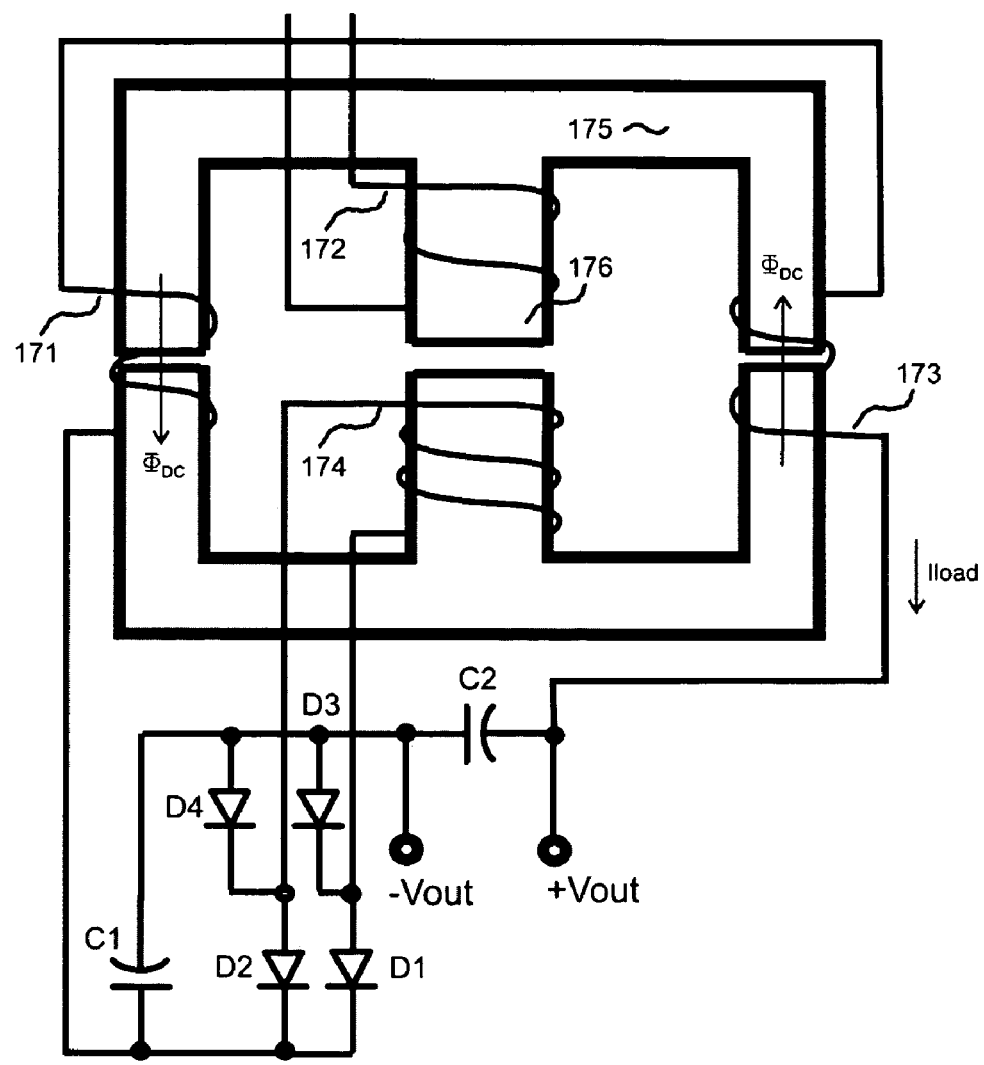
FIG. 11 illustrates an embodiment of the present invention with a single secondary winding connected to a full bridge rectifier and integrated filter inductor connected to the positive output terminal.
Figure 12:
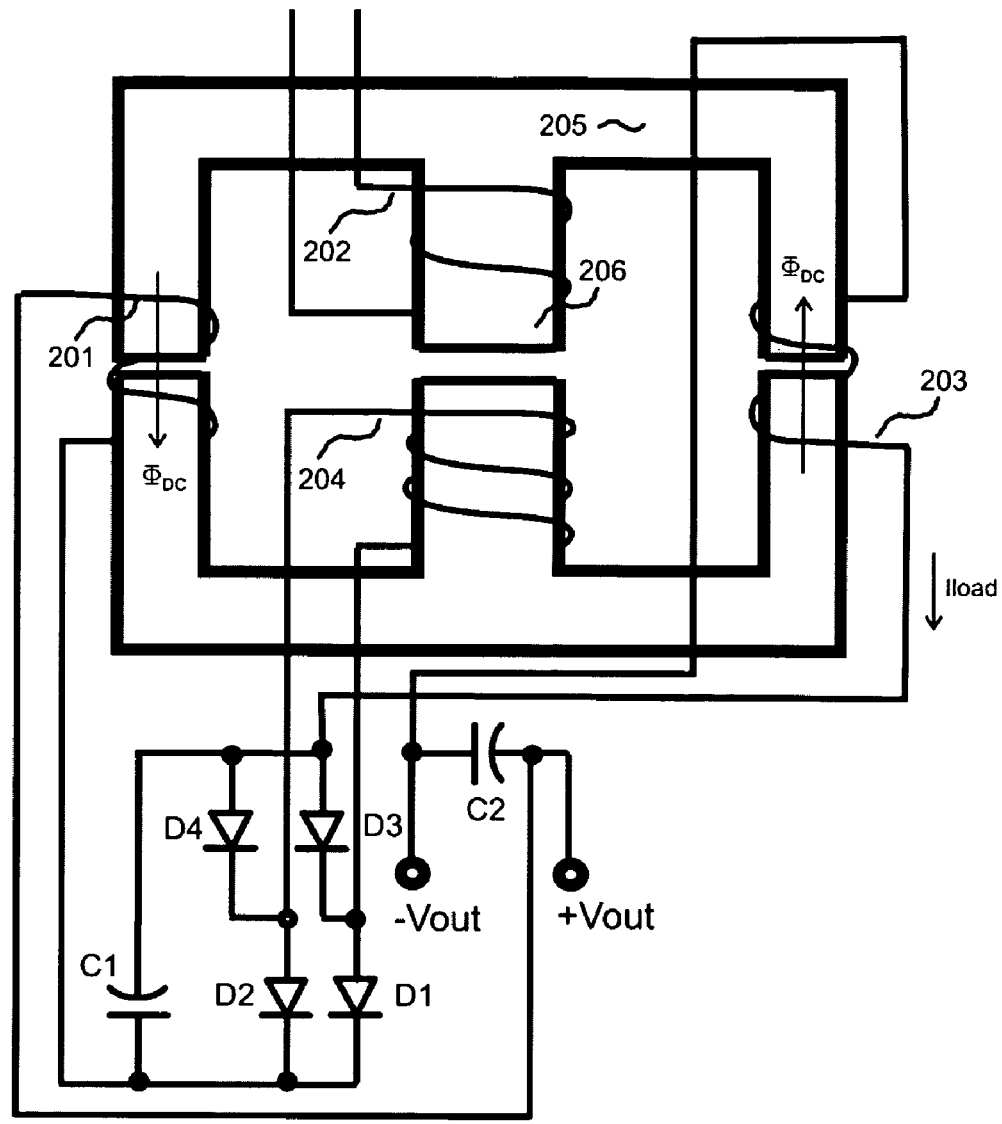
FIG. 12 illustrates an embodiment of the present invention with a single secondary winding connected to a full bridge rectifier and integrated filter inductor connected to both negative and positive output terminals.

FIGS. 10, 11 and 12 illustrate the options to connect the integrated magnetics transformer of the present invention to a full bridge rectifier configuration that is the preferred design choice at higher output voltages. In this case the secondary winding that powers the full bridge rectifier is not center tapped but single. In FIG. 10 the equivalent filter inductor of the integrated magnetics transformer is connected to the negative output terminal, in FIG. 11 this inductor is connected to the positive output terminal and in FIG. 12 the equivalent filter inductor is split into two sections connected to the both (positive and negative) output terminals.

In FIG. 10 the magnetic core 195 and windings 191, 192 and 193 of the integrated magnetics transformer are magnetically configured in the same manner as in the preferred embodiment in FIG. 1, meaning that the dc magnetic flux $\Phi_{DC}$ created in the side legs by the load current Iload does not saturate the side legs and does not flow through the center leg 196. The primary winding 192 in FIG. 10 is powered from the same series capacitor or series resonant network as 54 in FIG. 1. The side leg windings 191 and 193 in FIG. 10 are interconnected and magnetically reverse polarized in the same manner as windings 61 and 66 in FIG. 1. Contrary to FIG. 1 however, the secondary winding 194 wound on the center leg 196 in FIG. 10, is a single one and connected to four rectifiers D1, D2, D3 and D4 assembled in a typical, full bridge rectifier configuration where the common nodes of rectifiers D1, D3 and D2, D4 form the ac terminals of the bridge, while the common nodes of rectifiers D1, D2 and D3, D4 form the dc terminals of the bridge. Filter capacitor C2 in FIG. 10 is connected across the output terminals +Vout and −Vout (FIG. 10). The equivalent filter inductor comprising the series connection of reverse polarized side leg windings 191 and 193 is connected between the common anode of rectifiers D3 and D4 and the negative output terminal −Vout. The common cathode of rectifiers D1 and D2 is directly connected to the positive output terminal +Vout.

In FIG. 11 the magnetic core 175 and windings 171, 172 and 173 of the integrated magnetics transformer are magnetically configured in the same manner as in the preferred embodiment in FIG. 1, meaning that the dc magnetic flux $\Phi_{DC}$ created in the side legs by the load current Iload does not saturate the side legs and does not flow through the center leg 176. The primary winding 172 in FIG. 11 is powered from the same series capacitor or series resonant network as 54 in FIG. 1. The side leg windings 171 and 173 in FIG. 11 are interconnected and magnetically reverse polarized in the same manner as windings 61 and 66 in FIG. 1. The secondary winding 194 wound on the center leg 176 in FIG. 11, is a single one and connected to four rectifiers D1, D2, D3 and D4 assembled in a typical, full bridge rectifier configuration where the common nodes of rectifiers D1, D3 and D2, D4 form the ac terminals of the bridge, while the common nodes of rectifiers D1, D2 and D3, D4 form the dc terminals of the bridge. Filter capacitor C2 in FIG. 11 is connected across the output terminals +Vout and −Vout (FIG. 11). The equivalent filter inductor comprising the series connection of reverse polarized side leg windings 171 and 173 is connected between the common cathode of rectifiers D1 and D2 and the positive output terminal +Vout. The common anode of rectifiers D3 and D4 is directly connected to the negative output terminal −Vout.

FIG. 12 illustrates an arrangement of the integrated magnetics transformer with single secondary winding powering fill bridge rectifier and with split filter inductor connected to both output terminals similarly to the filter arrangement in FIG. 9. In FIG. 12 the magnetic core 205 and windings 201, 202 and 203 of the integrated magnetics transformer are magnetically configured in the same manner as in the preferred embodiment in FIG. 1, meaning that the dc magnetic flux $\Phi_{DC}$ created in the side legs by the load current Iload does not saturate the side legs and does not flow through the center leg 206. The primary winding 202 in FIG. 12 is powered from the same series capacitor or series resonant network as 54 in FIG. 1. The secondary winding 204 wound on the center leg 206 in FIG. 12, is a single one and connected to four rectifiers D1, D2, D3 and D4 assembled in a typical, full bridge rectifier configuration where the common nodes of rectifiers D1, D3 and D2, D4 form the ac terminals of the bridge, while the common nodes of rectifiers D1, D2 and D3, D4 form the dc terminals of the bridge. Filter capacitor C2 in FIG. 12 is connected across the output terminals +Vout and −Vout (FIG. 12). Side leg winding 201 is connected between the common cathode of rectifiers D1 and D2 and the positive output terminal +Vout, while side leg winding 203 is connected between the common anode of rectifiers D3 and D4 the negative output terminal −Vout. In this way the side leg windings 201 and 203, forming the equivalent filter inductor, are electrically connected to both output terminals.

While the present invention has been illustrated and described with respect to an E-shape transformer having a single primary winding and a center tapped or single secondary winding powering a center tap or full bridge rectifier respectively it is understood that other primary winding configurations are well within the broad scope of the present invention. Non-limiting examples of other primary winding configurations within the scope of the present invention are: multiple primary (as per the embodiment of U.S. Pat. No. 5,907,236)—center tap secondary winding powering center tap output rectifier; multiple primary (as per the embodiment of U.S. Pat. No. 5,907,236)—single secondary winding powering full bridge output rectifier.

Further circuit variation (referring to FIG. 1) well within the scope and the spirit of the present invention is available by having the center leg of the transformer ungapped. Such magnetic configuration is appropriate when the integrated magnetics transformer is powered by a resonant type converter that has internal means to extend its zero voltage switching operation and does not need the magnetizing current to perform this function. An example of such resonant type converter is described in U.S. Pat. No. 5,907,236, which is hereby incorporated by reference herein.

Additionally, exemplary embodiments of the present invention have been illustrated with reference to specific electronic and magnetic components. Those skilled in the art are aware, however, that components may be substituted (not necessarily with components of the same type) to create desired conditions or accomplish desired results. For instance, multiple components may be substituted for a single component and vice versa, Similarly, although a magnetic device having a single, E-magnetic core, has been illustrated, other configurations, such as magnetic devices having multiple cores, may be used to accomplish essentially the same results disclosed by the present invention. It is well known for example, that the magnetic structure of an E-core can be assembled from two U-cores, or from two toroidal cores. It is also very well known that any rectifying diodes can be replaced by Mosfet transistors controlled in a well known, synchronous rectification manner.

Although the present invention has been described in detail, those skilled in the art should understand that they can make various changes, substitutions and alterations herein without departing from the spirit and scope of invention in its broadest form.

What is claimed is:

1. A series resonant converter comprising:
   a magnetic E-core having a first and a second gapped side legs and a center leg;
   at least one primary winding wound about said center leg and connected to a series resonant network;
   a secondary winding wound about said center leg;
   a first auxiliary winding wound about said first side leg;
   a second auxiliary winding wound about said second side leg in reverse magnetic polarity to said first auxiliary winding; and
   said first and second auxiliary windings being in series with one another and with at least one of a pair of output terminals of the series resonant converter.

2. The converter of claim 1 wherein the gap length of said side legs is such that the DC current flowing through the side leg windings does not saturate the side legs.

3. The converter of claim 1 or 2 wherein the auxiliary windings are wound across the gaps in their respective side legs.

4. The converter of claim 2 wherein said center leg is gapped to define two segments spaced by a gap, said primary winding is wound on a first one of said segments and said secondary winding is wound on a second one of said segments.

5. The converter of claim 2 further comprising a filter capacitor one terminal of which is connected to a tap on said secondary winding.

6. The converter of claim 2 wherein said first and second auxiliary windings are connected in series with one another across a capacitor and wherein said series connection of said first and second auxiliary windings is connected in parallel with said pair of output terminals.

7. The converter of claim 1 wherein said secondary winding is center-tapped, said converter further comprising a rectifying diode connected to each end of said secondary winding.

8. The converter of claim 7 wherein said rectifying diodes are implemented by synchronously controlled MOSFET transistors.

9. The converter of claim 1 further comprising a full bridge rectifier associated with said secondary winding.

10. The converter of claim 9 wherein said full bridge rectifier is implemented by synchronously controlled MOSFET transistors.

11. The converter of claim 1 wherein said E-core is assembled from U-shaped magnetic cores.

12. The converter of claim 1 wherein said E-core is assembled of two toroidal shaped magnetic cores.

* * * * *